United States Patent
Treier et al.

(10) Patent No.: US 12,104,697 B2
(45) Date of Patent: Oct. 1, 2024

(54) COMPRESSION SEALING GASKET AND SEALING SYSTEM

(71) Applicant: GENERAL ELECTRIC TECHNOLOGY GMBH, Baden (CH)

(72) Inventors: Lukas Treier, Oberentfelden (CH); Robert Lüscher, Oberentfelden (CH); Philip Gerber, Oberentfelden (CH)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 0 days.

(21) Appl. No.: 18/261,377

(22) PCT Filed: Jan. 13, 2022

(86) PCT No.: PCT/EP2022/050679
§ 371 (c)(1),
(2) Date: Jul. 13, 2023

(87) PCT Pub. No.: WO2022/152811
PCT Pub. Date: Jul. 21, 2022

(65) Prior Publication Data
US 2024/0068569 A1    Feb. 29, 2024

(30) Foreign Application Priority Data

Jan. 15, 2021 (EP) ...................... 21151873

(51) Int. Cl.
*F16J 15/10*    (2006.01)
*F16J 15/12*    (2006.01)

(52) U.S. Cl.
CPC ............. *F16J 15/10* (2013.01); *F16J 15/123* (2013.01); *F16J 15/125* (2013.01); *F16J 15/128* (2013.01); *F16J 15/12* (2013.01)

(58) Field of Classification Search
CPC .. F16J 15/10; F16J 15/102; F16J 15/12; F16J 15/123; F16J 15/125; F16J 15/128; F16L 17/067; F16L 17/073; F16L 23/18
See application file for complete search history.

(56) References Cited

U.S. PATENT DOCUMENTS 2,249,127 A * 7/1941 Goetze ..................... F16J 15/12
                                                                    277/653
2,967,805 A * 1/1961 Forestek ................... F16J 15/32
                                                                    277/910

(Continued)

FOREIGN PATENT DOCUMENTS

| EP | 0915273 A2 | 5/1999 |
| EP | 3290754 A1 | 3/2018 |
| FR | 2642808 A1 | 8/1990 |

OTHER PUBLICATIONS

International Search Report and Written Opinion for PCT/EP2022/050679, dated Feb. 18, 2022, 14 pages.

(Continued)

*Primary Examiner* — Nicholas L Foster
(74) *Attorney, Agent, or Firm* — Eversheds-Sutherland (US) LLP

(57) ABSTRACT

The application concerns a compression sealing gasket including an annular main body made of an elastomer material and having a main axis A, the main body including an annular radially outer face and an annular radially inner face parallel and coaxial to each other, wherein the gasket includes an insert mounted on the inner face. The application also concerns a sealing system having the sealing gasket.

11 Claims, 4 Drawing Sheets

(56) References Cited

U.S. PATENT DOCUMENTS

| | | | |
|---|---|---|---|
| 3,195,906 A | 7/1965 | Moyers | |
| 3,531,133 A | 9/1970 | Sheesley et al. | |
| 3,572,731 A * | 3/1971 | Stecher | F16J 15/123 |
| | | | 277/601 |
| 3,836,159 A | 9/1974 | Dryer | |
| 3,857,572 A * | 12/1974 | Taylor | F16L 23/20 |
| | | | 277/609 |
| 3,869,132 A * | 3/1975 | Taylor | F16J 15/12 |
| | | | 277/944 |
| 4,147,274 A * | 4/1979 | Hall | B65D 88/50 |
| | | | 277/440 |
| 4,330,136 A * | 5/1982 | Henson | F16J 15/104 |
| | | | 277/921 |
| 4,348,032 A * | 9/1982 | Hanson | F16J 15/025 |
| | | | 277/594 |
| 4,585,239 A * | 4/1986 | Nicholson | F16J 15/3212 |
| | | | 277/570 |
| 5,518,257 A * | 5/1996 | Breaker | F16L 23/18 |
| | | | 277/627 |
| 5,538,262 A * | 7/1996 | Matsumura | F16J 15/128 |
| | | | 277/913 |
| 6,755,422 B2 * | 6/2004 | Potter | F16J 15/061 |
| | | | 277/654 |
| 7,464,968 B2 * | 12/2008 | Sakazaki | F16J 15/064 |
| | | | 285/236 |
| 8,146,924 B2 * | 4/2012 | Ohmi | F16J 15/0887 |
| | | | 277/654 |
| 9,360,114 B2 * | 6/2016 | Trompenaars | F16J 15/32 |
| 10,591,064 B2 * | 3/2020 | Yanagitake | F16L 23/16 |
| 2004/0157035 A1 * | 8/2004 | Guizzetti | B32B 27/322 |
| | | | 428/66.6 |
| 2010/0019455 A1 | 1/2010 | Kent et al. | |
| 2019/0011049 A1 * | 1/2019 | Yanagitake | F16J 15/125 |

OTHER PUBLICATIONS

Extended European Search Report issued in EP Application No. 21151873.3 dated Jun. 16, 2021, 7 pages.

* cited by examiner

COMPRESSION SEALING GASKET AND SEALING SYSTEM

TECHNICAL FIELD

The invention concerns a compression sealing gasket designed to reduce its permeability to gas.

The sealing gasket is intended to be implemented on gas insulated apparatuses, at the connection between two parts.

PRIOR ART

Some high voltage apparatuses comprise hollow components in which conductors are arranged.

An insulating gas fills these components, to isolate the conductors carrying current at a high voltage from the hollow components which are at ground potential.

The insulating gas is also able to withstand the dielectric field in short distances between conductors arranged in the component.

The connection between two components comprises a tubular part from each component and a sealing gasket placed between the tubular parts.

According to a known embodiment, the sealing gasket is made of an elastomer and is compressed between the two tubular parts.

The compression of the tubular parts produces an elastic deformation of the gasket, improving the tightness of the connection.

However, the gasket is generally made of an elastomer that shows a permeability to the insulating gas.

The object of the invention is to provide a sealing gasket having a significantly lower permeability, in order to reduce the leakage rate for a complete apparatus.

The aim is to reach for the overall arrangement a leakage rate in the range of than 0.5% vol/year as describes in the relevant IEC standards for switchgear, for example IEC 62271-203 for gas insulated switchgear.

This improvement is of particular interest since the industry moves towards insulating gasses, consisting of different mixtures and different gasses, that show other impact of leaks due to the different characteristics of those new molecules used compared to the prevailing SF6 gas that has been used for decades.

BRIEF DESCRIPTION OF THE INVENTION

The invention concerns a compression sealing gasket comprising an annular main body made of an elastomer material and having a main axis A, the main body comprising an annular radially inner face and an annular radially outer face parallel and coaxial to each other, wherein the gasket comprises an insert mounted on the inner face.

The insertion of an insert in the main body reduces the section through which the gas can migrate. The insert may be made of any material that has a significant lower permeability than the main sealing material made of elastomer.

Also, the insert locally increases the axial compression of the elastomer main body.

As an alternative solution also a surface treatment on part of the gasket or covering the full gasket may be used to act as a barrier to decrease the permeability of the overall sealing system drastically.

Preferably, the inner face comprises a throat extending coaxially to main axis A and in which the insert is fitted.

Preferably, both the throat and the insert extend along the entire periphery of the inner face.

Preferably, the inner face comprises a plurality of throats each of the throats extending along a segment of the periphery of the inner face and receiving an associated insert.

Preferably, the axial height of the throat is at least 80% of the axial dimension of the main body.

Preferably, the shape of a cross section of the insert through an axial plane is a rectangle.

Preferably, the shape of a cross section of the insert through an axial plane or is convex oriented radially towards or away from main axis A.

Preferably, the gasket further comprises a coating covering the outer face of main body and the insert.

Preferably, the axial dimension of the insert equals the axial dimension of the main body.

Preferably, the insert is made of a material having a lower gas permeability than the material of the main body.

Preferably, the insert is metallic, made of a thermoplastic material or an elastomer.

The invention also concerns a sealing system comprising two cylindrical components arranged coaxially to each other and to a main axis A, in which each of the components comprises an end face extending in a plane perpendicular to main axis A, that faces the assembling face of the other component and wherein a compression sealing gasket according to any preceding claim is arranged and is compressed axially between the assembling faces of the cylindrical components.

Preferably, at least one of the assembling faces comprises an annular recess in which the compression sealing gasket is fitted.

Preferably, the insert is axially compressed by the assembling faces.

DETAILED DESCRIPTION OF PARTICULAR EMBODIMENTS

Figure 1:
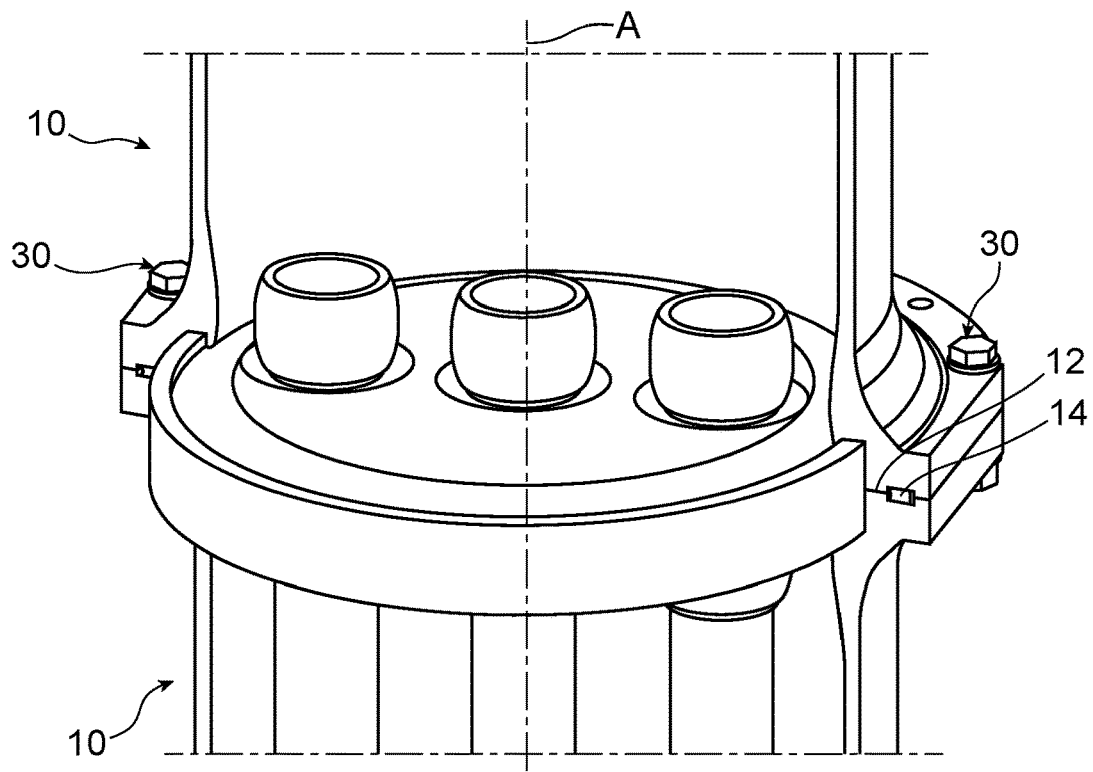
FIG. 1 is a schematic diagram of a high voltage apparatus comprising two components assembled together using a gasket according to the invention.

FIG. 1 illustrates a portion of a high voltage apparatus comprising components 10 assembled one to the other. Here, each component 10 is represented as a cylindrical and tubular component.

It will be understood that the components may be of any other shape that comprises a tubular part as represented on the drawings.

In the following description, the tubular elements represented will be designated as the components 10.

The components 10 extend coaxial to a main axis A of the high voltage apparatus.

Figure 2A:
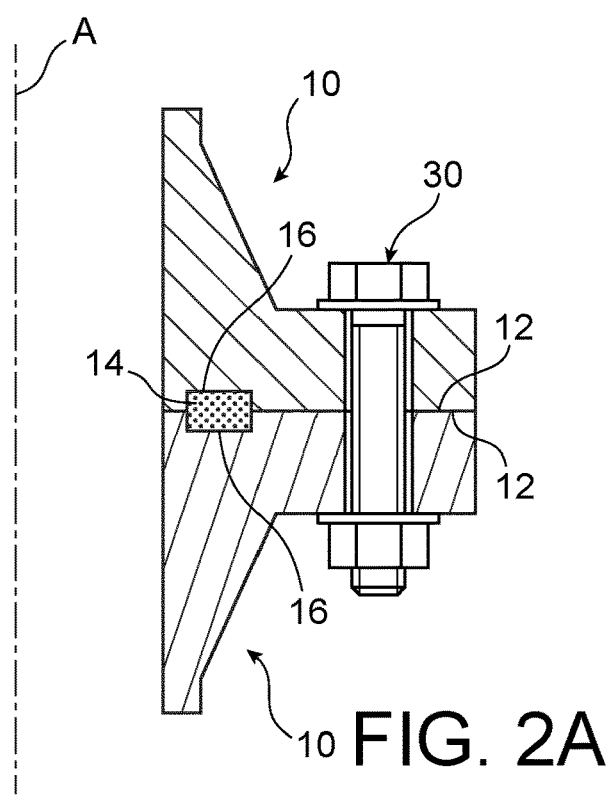
FIGS. 2A and 2B are details of the assembly of the components showing how the gasket is received between the two components.
Figure 2B:
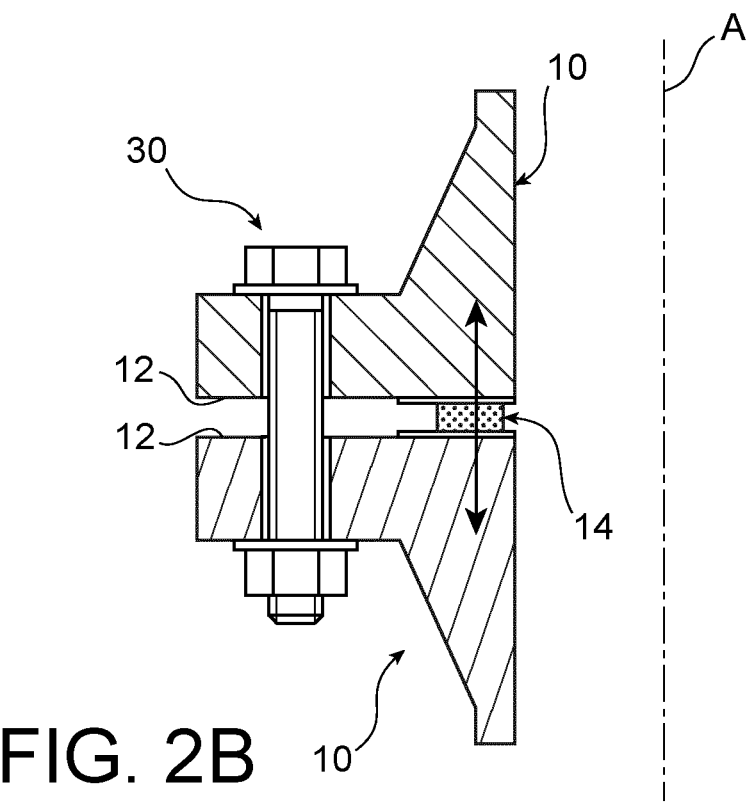

As can be seen in more details in FIGS. 2A and 2B, each component 10 comprises an end face 12 which faces, and is connected, to the end face 12 of the other component 10.

A sealing system for connecting the components 10 comprises a compression sealing gasket 14 of annular general shape that is arranged axially between the end faces 12 of the two components 10.

The sealing system comprises tightening means 30, such as bolting means that press axially one component 10 towards the other.

The tightening means 30 also compress axially the sealing gasket 14 to provide a gastight connection between the two components 10.

According to a first embodiment represented on FIG. 2A, the end face 12 of each component 10 comprises an annular recess 16 in which part of the sealing gasket 14 is received.

The axial depth of the recesses 16 is inferior to half of the axial height of the gasket 14 before the two components 10 are assembled. As a consequence, before the definitive assembling of the components 10, the gasket 14 protrudes axially from the end face 12 of each component 10.

According to another embodiment shown on FIG. 2B, the gasket 14 is in contact with the end faces 12 of both components 10 and maintains the end faces 12 distant one from the other.

The compression of the gasket 14 by the tightening means 30 produces an axial deformation of the gasket 14 and maintains an efficient pressure of the gasket 14 on the end faces 12 and against the walls and bottom of the recess 16.

The gasket 14 comprises a main body 18 made of an elastomer like, as a non-limiting example, the one known as "Butyl".

The permeability of this elastomer with respect to the gas intended to fill the components 10 results in a loss of gas during time.

Figure 3:
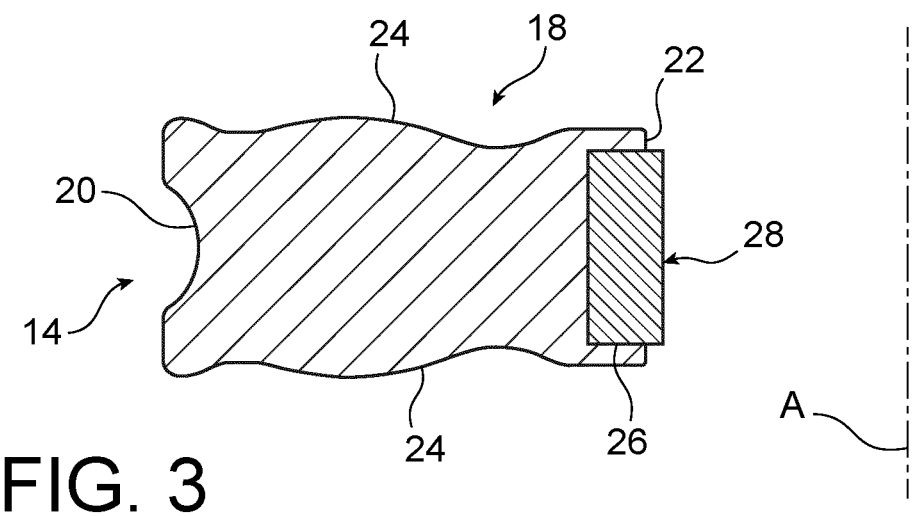
FIG. 3 is a diagram showing a first embodiment of the gasket.
Figure 4:
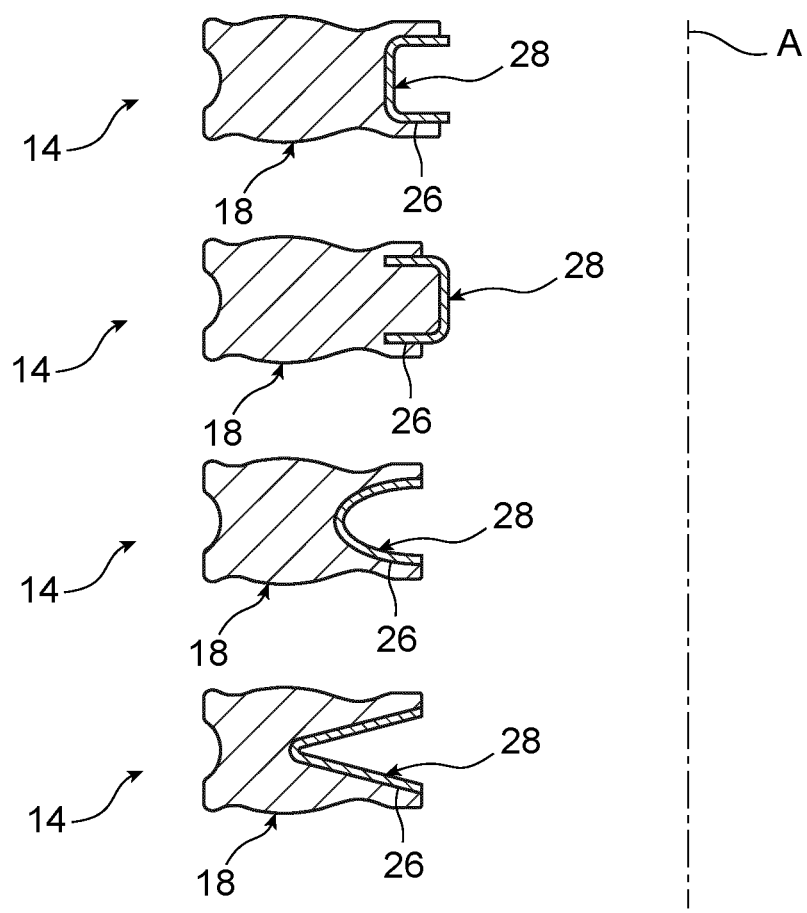
FIG. 4 shows diagrams representing various other embodiments of the insert in the gasket.

As can be seen on FIGS. 3 and 4, a section of the main body 18 of the gasket 14, along an axial plane containing main axis A, is of general rectangular shape.

The main body 18 of the gasket 14 then comprises an annular radially outer face 20, an annular radially inner face 22 and two planar annular end faces 24 that axially delimit the gasket 14 and connect the inner face 22 to the outer face 20.

According to a preferred embodiment, the faces 20, 22, 24 of the main body 18 are wave shaped to enhance the sealing. The faces 20, 22, 24 can have a different shape, or be rectilinear without going beyond the scope of the invention.

In order to reduce the permeability of the gasket 14, the inner face 22 comprises an annular throat 26 extending coaxially to main axis A and in which an insert 28 is arranged. The throat 26 is open radially towards main axis A.

According to a preferred embodiment, the insert 28 is designed to be impermeable to the gas. Accordingly, it reduces the overall permeability of the gasket 14.

As non-limiting examples, the insert 28 is made from various materials; it can be metallic, made of a thermoplastic material or another elastomer.

According to other embodiment, the insert 28 can be made of any material that has a lower permeability that the material of the gasket 14.

Also, in the vicinity of the insert 28, more particularly between the insert 28 and each end face 24, the main body 18 of the gasket 14 is more compressed than at other places, this also reduces the permeability of the gasket 14 to the gas.

According to a first embodiment, both the throat 26 and the insert 28 extend along the entire periphery of the inner face 22, that is to say they are both circular.

According to another embodiment, the inner face 22 comprises a plurality of throats 26 and inserts 28 distributed along the circumference of the inner face 22.

Each pair of throats 26 and inserts 28 extend along a ring sector of the circumference of the inner face 22, this ring sector being centered on main axis A.

The axial height of the insert 28 is inferior to the axial height of the main body 18 of the gasket 14, that is to say inferior to the axial distance between the end faces 24.

Preferably, the axial height of the insert 28 and of the associated throat 26 is at least of 80% of the axial height of the main body 18 of the gasket 14.

The insert 28 can have various shapes.

Non limiting examples of the section of the insert 28 are represented on FIGS. 3 and 4.

This section can be rectangular, in the shape of a U, a V or can be curved, with the opening of the section oriented radially towards or away from the main axis A.

It will be understood that the shapes of the section represented are only given as examples and the shape of the section can be different.

Figure 5:
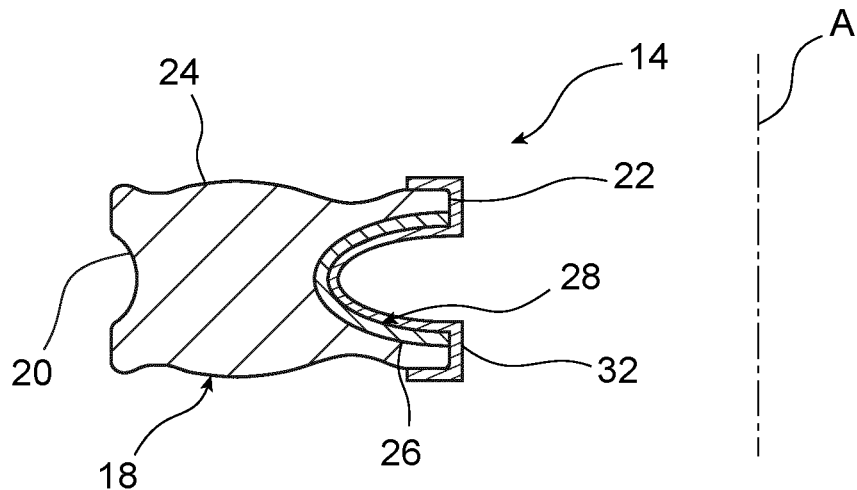
FIG. 5 is a diagram of a variant embodiment of the casket comprising a layer of coating.

As represented on FIG. 5, in order to further reduce the permeability of the gasket 14, a coating 32 covers the radially inner face of the insert 28 and the inner face 22 of the main body 18.

The coating 32 functions as an additional barrier to the gas.

The coating 32 is preferably made by chemical vapor deposition or by atomic layer deposition.

Figure 6:
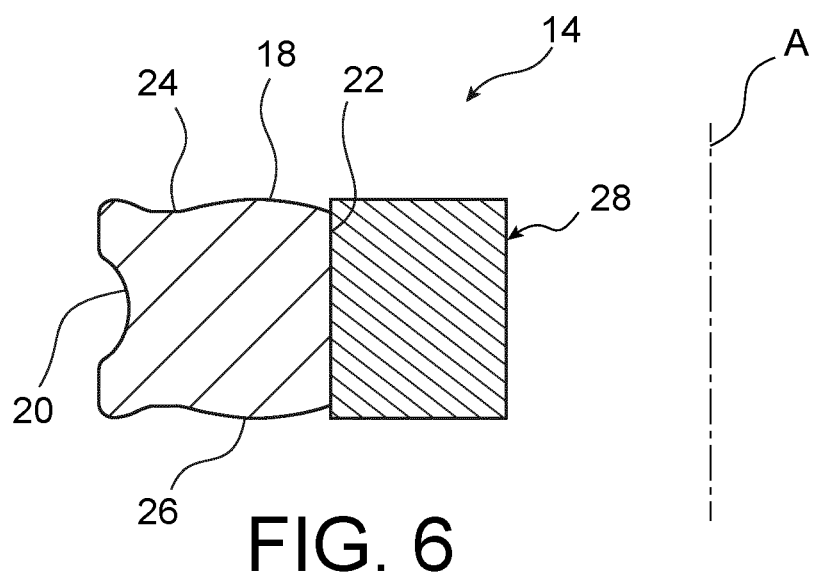
FIG. 6 is a diagram of a variant embodiment of the casket comprising an insert extending axially over the whole length of the gasket.

As represented on FIG. 6, the gasket 14 comprises an insert 28 that extends axially over the entire axial dimension of the gasket 14.

This insert 28 is mounted on the inner face 22 of the main body 18 and covers it completely.

Here, the section of this insert is of rectangular shape and comprises axial end faces 34 that come in contact with the assembling faces 12 of the components 10.

We claim:

1. A compression sealing gasket comprising an annular main body made of an elastomer material and having a main axis A, the main body comprising an annular radially outer face and an annular radially inner face parallel and coaxial to each other;
    wherein the gasket comprises an insert mounted on the inner face;
    wherein the inner face comprises a throat extending coaxially to the main axis A and in which the insert is fitted;
    wherein the gasket further comprises a coating covering and in contact with the inner face of the main body and the insert.

2. A gasket according to claim 1, wherein an axial height of the throat is at least 80% of the axial dimension of the main body.

3. A gasket according to claim 1, wherein a shape of a cross section of the insert through an axial plane is a rectangle.

4. A gasket according to claim 1, wherein a shape of a cross section of the insert through an axial plane is convex and is oriented radially towards or away from the main axis A.

5. A gasket according to claim 1, wherein an axial dimension of the insert equals the axial dimension of the main body.

6. A gasket according to claim 1, wherein the insert is made of a material having a lower gas permeability than a gas permeability of a material of the main body.

7. A gasket according to claim 6, wherein the insert is metallic, made of a thermoplastic material, or an elastomer.

8. A gasket according to claim 1, wherein the coating is made by chemical vapor deposition or by atomic layer deposition.

9. A sealing system comprising two cylindrical components arranged coaxially to each other and to a main axis A, in which each of the components comprises an end face extending in a plane perpendicular to the main axis A, that faces the end face of the other component, and
   wherein a compression sealing gasket according to claim 1 is arranged and is compressed axially between the assembling faces of the cylindrical components.

10. A sealing system according to claim 9, wherein at least one of the assembling faces comprises an annular recess in which the compression sealing gasket is fitted.

11. A sealing system according to claim 9, wherein an axial dimension of the insert equals the axial dimension of the main body and wherein the insert is axially compressed by the assembling faces.

* * * * *